(12) United States Patent
Downard (10) Patent No.: US 9,622,468 B2
(45) Date of Patent: Apr. 18, 2017

(54) DYNAMIC GAME DECOY

(71) Applicant: William Glen Downard, West Des Moines, IA (US)

(72) Inventor: William Glen Downard, West Des Moines, IA (US)

(73) Assignee: KillerGear LLC, Indianola, IA (US)

( * ) Notice: Subject to any disclaimer, the term of this patent is extended or adjusted under 35 U.S.C. 154(b) by 0 days.

(21) Appl. No.: 14/087,135

(22) Filed: Nov. 22, 2013

(65) Prior Publication Data

US 2015/0143735 A1 May 28, 2015

(51) Int. Cl.
*A01M 31/06* (2006.01)

(52) U.S. Cl.
CPC .................... *A01M 31/06* (2013.01)

(58) Field of Classification Search
CPC ...... A01M 31/025; A01M 31/06; A45B 25/02
USPC .................... 43/1, 2; 135/15.1, 20.1
See application file for complete search history.

(56) References Cited

U.S. PATENT DOCUMENTS

| | | | | |
|---|---|---|---|---|
| 2,547,770 | A * | 4/1951 | Pelton | 135/126 |
| 4,590,699 | A * | 5/1986 | Nicks | A01M 31/06 43/2 |
| 5,214,872 | A * | 6/1993 | Buyalos, Jr. | 43/1 |
| 5,572,823 | A * | 11/1996 | Savaria | 43/2 |
| 5,787,632 | A * | 8/1998 | Kraut | 43/1 |
| 5,944,041 | A * | 8/1999 | Kitchens | 135/98 |
| 6,296,005 | B1 * | 10/2001 | Williams et al. | 135/98 |
| 6,385,895 | B1 * | 5/2002 | Scaries | 43/2 |
| 6,543,175 | B1 * | 4/2003 | Tucker | A01M 31/00 42/94 |
| 6,745,787 | B1 * | 6/2004 | Curtis | 135/98 |
| 6,925,745 | B1 * | 8/2005 | Alessi | A01M 31/025 135/901 |
| D560,745 | S | 1/2008 | Bulger | |
| D560,746 | S | 1/2008 | Bulger | |
| 7,665,476 | B2 * | 2/2010 | Lisciandro et al. | 135/20.1 |
| 7,828,003 | B2 * | 11/2010 | Montecucco | 135/98 |
| 8,051,864 | B1 * | 11/2011 | Gabrielson et al. | 135/16 |
| 8,869,783 | B2 * | 10/2014 | Faherty | 124/86 |
| 9,066,512 | B2 * | 6/2015 | Nolz et al. | |
| 2002/0046480 | A1 * | 4/2002 | Kowalski | 43/1 |
| 2005/0145272 | A1 * | 7/2005 | Dubinsky-Witkowski | 135/16 |
| 2006/0070644 | A1 * | 4/2006 | Schneller | 135/20.1 |
| 2008/0216381 | A1 * | 9/2008 | Wyant | 43/2 |
| 2012/0298159 | A1 * | 11/2012 | Di Cesare | 135/20.1 |
| 2012/0324777 | A1 * | 12/2012 | Smith | 43/2 |
| 2014/0261595 | A1 * | 9/2014 | Mausen | 135/90 |

\* cited by examiner

*Primary Examiner* — Christopher P Ellis
*Assistant Examiner* — Michael Wang
(74) *Attorney, Agent, or Firm* — Brett J. Trout (57) ABSTRACT

An apparatus and method for attracting game animals such as a turkey. An asymmetric canopy is provided with the image of a game animal such as a turkey. The canopy is coupled to a shaft and a plurality of extensible rib assemblies. A runner provided along the shaft and coupled to the extensible rib assemblies deploys and collapses the canopy as the runner is moved back and forth. The canopy is provided with a truncated flat bottom so as not to interfere with a hunters feet when the hunter is moving and to reduce snagging of the canopy on weeds and brush. The canopy may be deployed and collapsed to mimic the action of a strutting tom turkey.

5 Claims, 6 Drawing Sheets

DYNAMIC GAME DECOY

TECHNICAL FIELD

The disclosed embodiments relate generally to game blinds and game decoys and, in particular, to a dynamic game decoy that also serves as a dynamic stalking blind.

BACKGROUND OF THE INVENTION

Game decoys are well known in the art. Decoys may be two-dimensional or three-dimensional images of game or prey. Two-dimensional images may be provided on a fabric such as that described in Montecucco U.S. Pat. No. 7,828,003, which is incorporated herein by reference. Such "umbrella" type decoys are also large enough to serve as stationary game blinds by providing an area behind the decoy for the hunter to hide. One drawback associated with such prior art devices is the lack of decoy movement to attract game from a distance. It would be desirable to provide a dynamic component to attract game.

Another drawback associate with such prior art devices is the inability to use the decoy while stalking game. While it is possible to collapse such decoys for movement, collapsing the decoy not only impedes the decoy feature of the device but also impedes the blind feature of the device. While it may be possible to move such a prior art collapsible decoy while the decoy is in its expanded orientation, the construction of such prior art devices makes it difficult to move with the decoy expanded. Additionally, because prior art expandable decoys taper near the bottom, hunters are more inclined to maintain the decoy lower, to hide the hunters' lower extremities, making it more likely the decoy will snag grass, bushes and other ground debris if the decoy is moved in the expanded orientation. Thus, there is a need for a portable game decoy with a construction allowing for ease of movement toward the game, while maintaining or increasing both the decoy and the blind features of the device.

Yet another drawback associated with prior art umbrella type game decoys is the unrealistic circular polygonal silhouette such devices present. It would therefore be desirable to provide an umbrella type game decoy that presents a truncated circular polygonal silhouette closer to the silhouette of an actual strutting tom turkey.

SUMMARY OF THE DISCLOSED SUBJECT MATTER

The deficiencies described above are overcome by the disclosed implementation of an apparatus and method for attracting game while providing a blind for a hunter. An asymmetric decoy is provided having an asymmetric canopy and a shaft extending at least partially below the canopy. The image of an animal is provided on the canopy. A slide is provided around the shaft and a plurality of first extensible rib assemblies are coupled between the slide and the canopy to open and close the canopy as the slide is moved up and down the shaft. A plurality of second extensible ribs, shorter than the plurality of first extensible rib assemblies is also coupled between the slide and the canopy. The plurality of first extensible rib assemblies define a generally curved top surface of the decoy while the plurality of second extensible rib assemblies define a substantially flat bottom surface of the decoy.

When there is desire to use the asymmetric decoy, a user slides the slide back and forth along the shaft, giving the image on the canopy the appearance of a tom turkey in strut.

The features and advantages described in this summary and in the following detailed description are not all-inclusive. Additional features and advantages may be apparent to one of ordinary skill in the art in view of the drawings, specification and claims presented herein.

BRIEF DESCRIPTION OF THE DRAWINGS

The present invention will now be described, by way of example, with reference to the accompanying drawings in which.

DETAILED DESCRIPTION OF THE DRAWINGS

Figure 1:
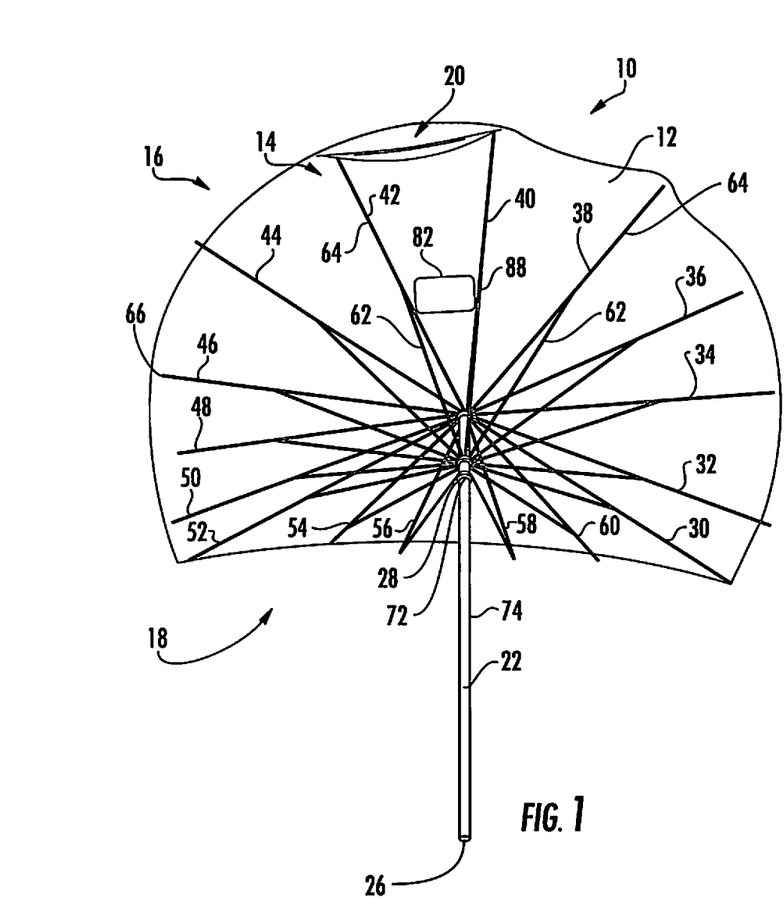
FIG. 1 illustrates a rear perspective view of the dynamic game decoy of the present invention.

FIG. 1 the dynamic game decoy of the present invention is shown generally as 10 in FIG. 1 the decoy is provided with an asymmetric canopy 12 having sixteen triangular sections 14, sewn, welded or otherwise secured to one another in a manner such as that known in the art. The canopy 12 may be constructed of any suitable material including, but not limited to, polyester, nylon, cotton, or any other desired material. In the preferred embodiment, the canopy forms a truncated polygon with ten sides forming a generally curved top 16 and one side forming a generally flat bottom 18. In the preferred embodiment, the flat bottom 18 is opposite flat portion 20 of one of triangular sections 14. Preferably, the flat bottom 18 is twice the length of the flat portion 20 and more preferably at least three times the length of the flat portion 20. Although the curved top 16 of the asymmetric canopy 12 is polygonal, in the preferred embodiment, the polygon may be a truncated semi-circle or the canopy 12 may be any other desired configuration.

Figure 2:
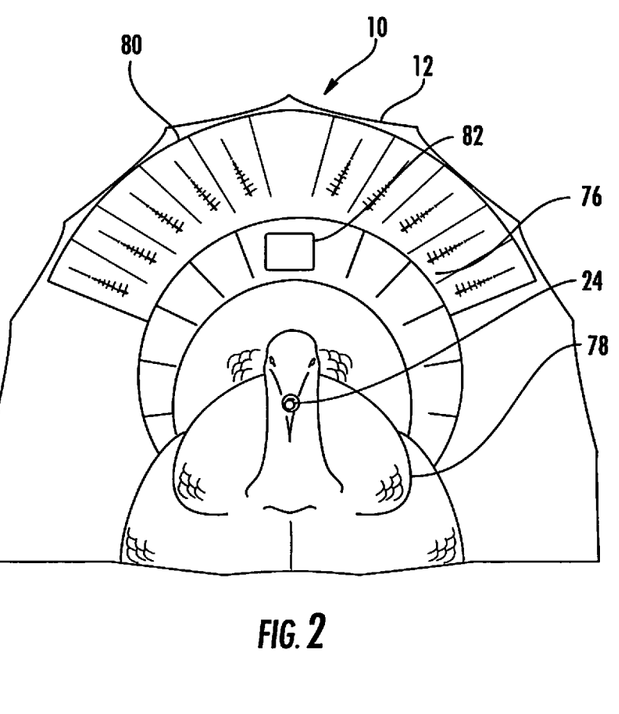
FIG. 2 illustrates a front elevation of the dynamic game decoy of FIG. 1.
Figure 3:
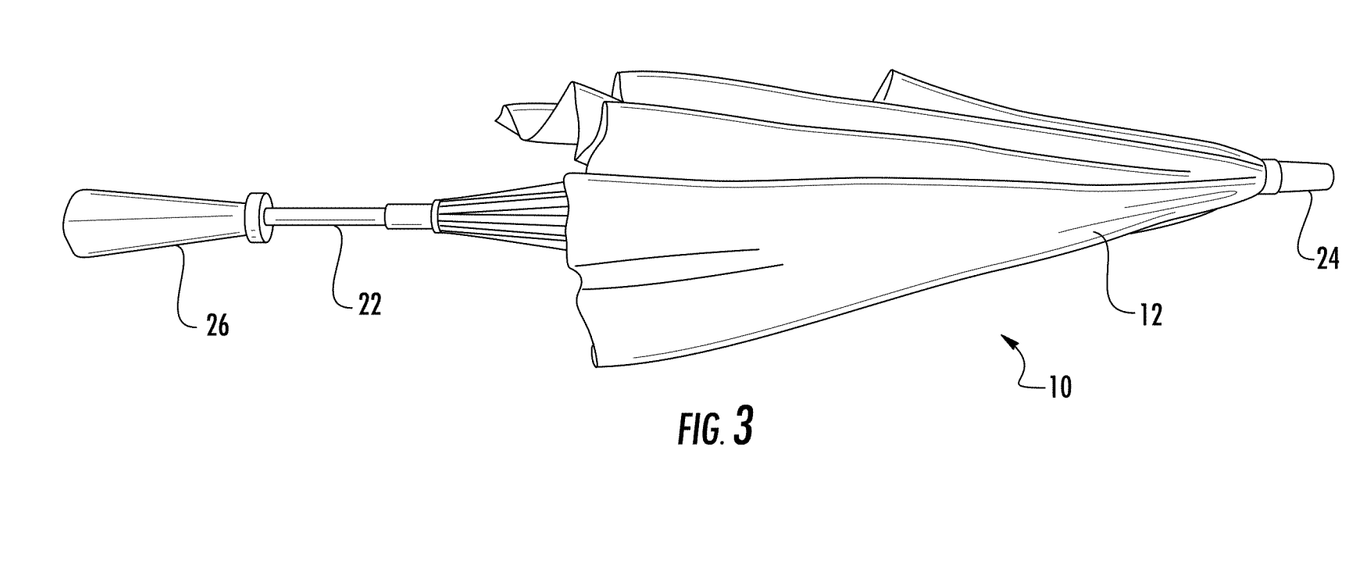
FIG. 3 illustrates a front perspective view of the dynamic game decoy of FIG. 1 shown in the collapsed orientation.

As shown in FIGS. 1-2, a shaft 22 extends from the asymmetric canopy 12 to a position at least partially below the asymmetric canopy 12. Preferably the shaft 22 extends through the canopy 12 and is fitted on the opposite side of the canopy with a ferrule 24 in a manner such as that known in the art. If desired, the ferrule 24 may be a flat button, instead of a shaft. The shaft 22 may be solid or hollow and may be constructed of any suitable material such as aluminum steel or plastic. Provided on the shaft 22 is a handle 26 which may be strait, curved or of any desired configuration. Slidably coupled to the shaft 22 is a slide, such as a runner 28, similar to those known in the art. Secured between the runner 28 and the canopy 12 are a plurality of first extensible rib assemblies 30, 32, 34, 36, 38, 40, 42, 44, 46, 48, 50 and 52. Also secured between the runner 28 and the canopy 12, are a plurality of second extensible rib assemblies 54, 56, 58 and 60.

The first extensible rib assemblies are substantially similar in construction such as that well known in the art. All of the extensible rib assemblies 30-60 are provided with a stretcher 62 pivotally coupled on one end to the runner 28 on the opposite end and to a rib 64. The stretchers 62 of all the extensible rib assemblies 30-60 are all of a similar design length and construction, and the ribs 64 of the first extensible rib assemblies 30-52 are all of a similar design length and construction. The ribs 64 of the second extensible rib assemblies 56-58 however, are shorter, and the ribs 64 of the second extensible rib assemblies 54 and 60 are shorter than the ribs 64 of the first extensible rib assemblies 30-52, but longer than the ribs 64 of the second extensible rib assemblies 56-58.

The length of the ribs 64 may be varied, but are preferably optimized to support the truncated polygon of the canopy 12. If desired, ribs 64 associated with some of the rib assemblies such as 30 and 52 may be extra long to support a canopy 12 of a different dimension, such as a canopy 12 having sides which extend strait downward to form a right angle with the flat bottom 18 of the canopy 12. Also, the ribs 64 of the rib assemblies 56 and 58 may extend past the canopy 12 to serve as ground engagers to stabilize the decoy 10, when the decoy 10 is placed on the ground.

Figure 4:
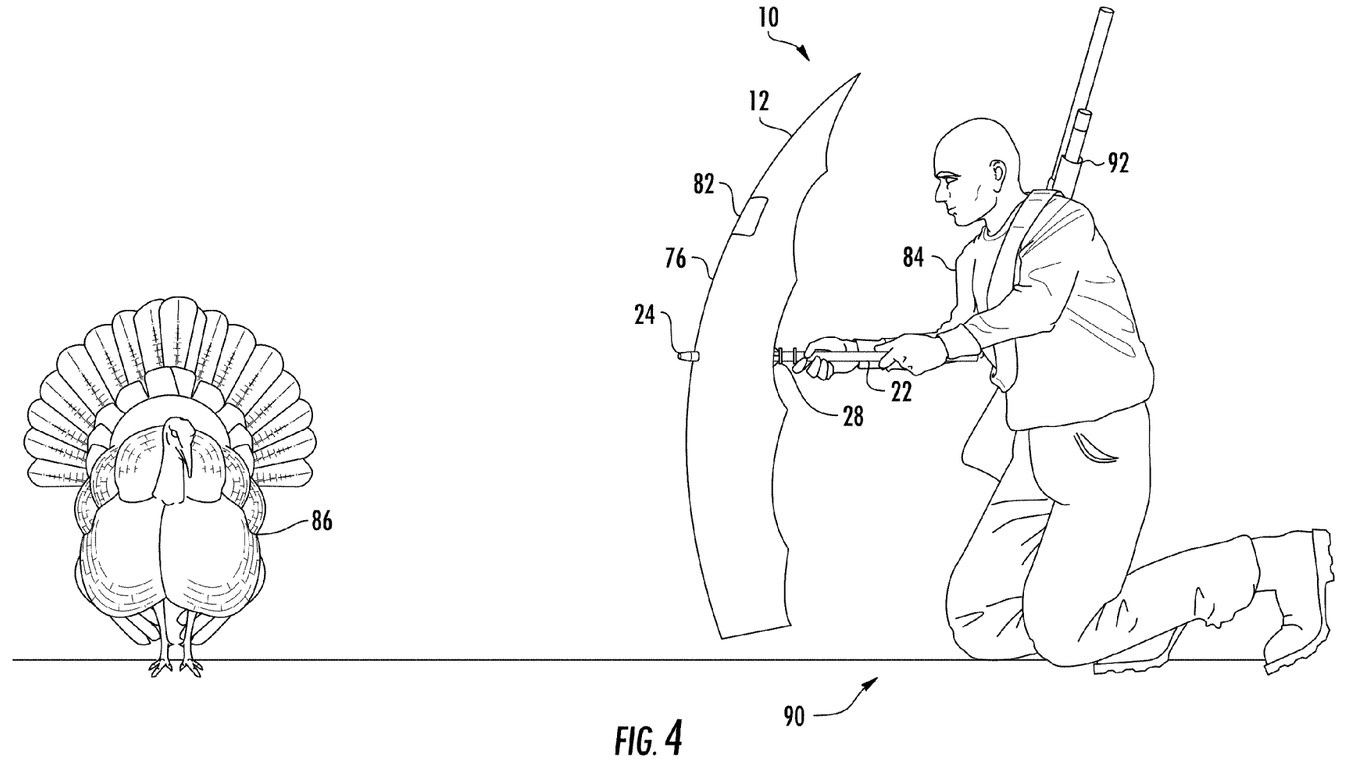
FIG. 4 illustrates a side elevation of a hunter using the dynamic game decoy of FIG. 1 to attract a turkey.

The ribs 64 preferably fits into pockets 66 formed in the canopy 12 in a manner such as that known in the art. The decoy 10 operates in a manner similar to that of an ordinary umbrella such that when a hunter slides the runner 28 toward the handle 26, the runner 28 pulls the stretcher 62 of the extensible rib assemblies 30-60 downward, pulling the ribs 64 and canopy 12 downward into the collapsed orientation. (FIGS. 1 and 4). If desired, a cord or other retaining system may be wrapped around the canopy 12 to maintain the decoy 10 in the collapsed position. Similarly, when a hunter moves the runner 28 toward the ferrule 24, the runner 28 pushes the stretchers 62 upward, causing the ribs 64 of the extensible rib assemblies 30-60 to deploy the canopy 12. Preferably, the shaft 22 is provided with a spring actuated upper catch 72 and a spring actuated lower catch 74 to retain the runner 28 and thereby the decoy 10 in either a collapsed or deployed orientation.

As shown in FIG. 2, a lure 76 is provided on the canopy 12. The lure 76 may be screen-printed, air brushed, spray painted, or provided by any other means known in the art. The lure 76 may be lines, colors, or, in the preferred embodiment, the image of a tom turkey. In the preferred embodiment, the lure 76 is provided with a body 78 and a tail 80. Not only is the lure 76 preferably not only more than twice as large as the average tom turkey, but the scale of the tail 80 relative to the body 78 is larger than the scale of the tail of the average turkey to the body of the average turkey. In the preferred embodiment, the scale of the tail 80 is preferably at least 3% greater than the scale of the body, more preferably at least 5% larger than the scale of the body 80 and most preferably at least 8% larger than the scale of the body 80.

As shown in FIGS. 1-2, a viewing port 82 is provided in the canopy 12 to allow a hunter 84 to view a turkey 86 through the canopy 12. (FIGS. 1-2 and 4). The viewing port 82 may be a hole provided in the canopy 12 or the hole may be covered with a screen 88 to further disguise the hunter 84 from the turkey 86. As shown in FIG. 4, when it is desired to use the decoy 10 to attract a turkey 86, the hunter 84 grabs the runner 28 in one hand and the handle 26 in the other hand and pushes the runner 28 toward the ferrule 24 to deploy the canopy 12. Once the canopy 12 is deployed the size of the lure 76 of the turkey on the canopy is large enough to distract a turkey 86 from the hunter's extremities 90 that may not be covered by the canopy 12.

Figure 5:
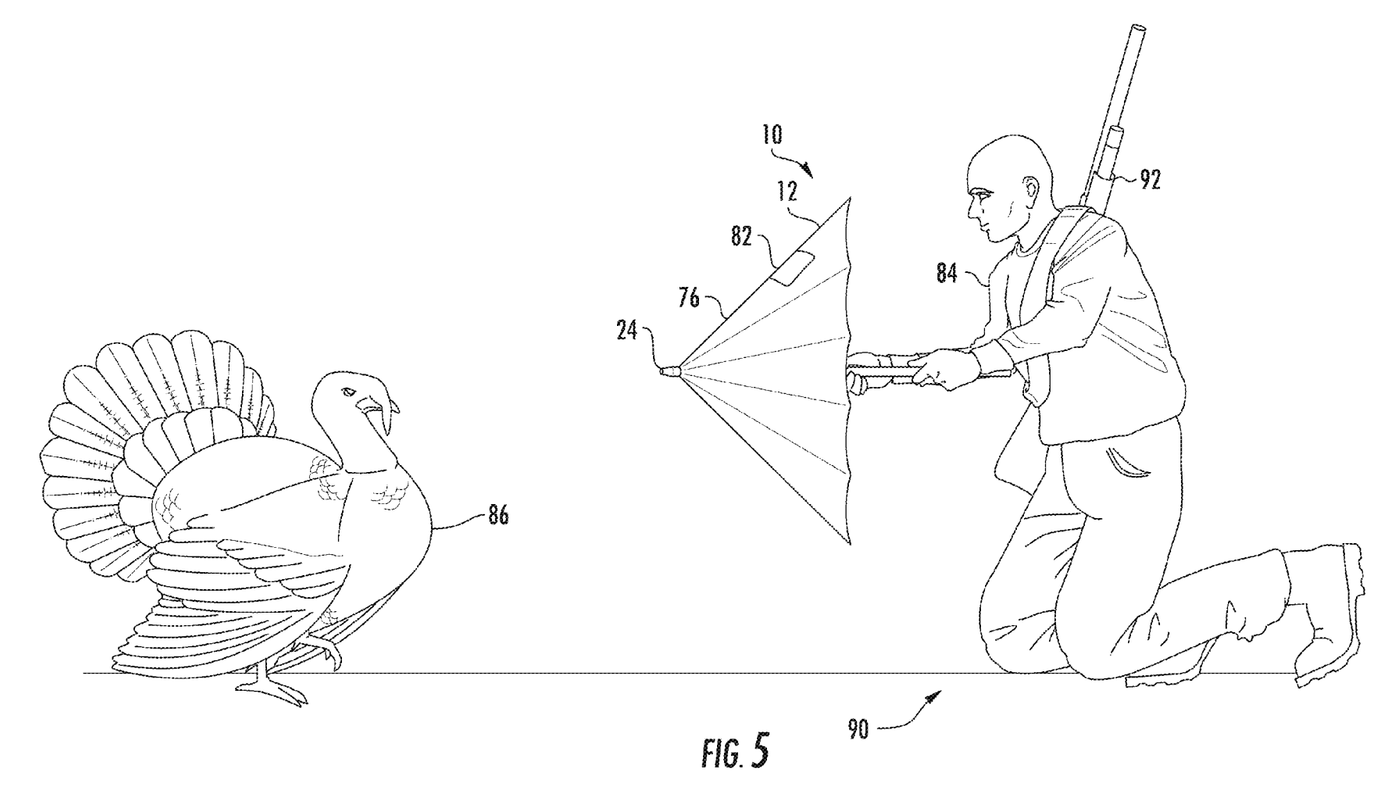
FIG. 5 illustrates a side elevation of a hunter collapsing the dynamic game decoy of FIG. 1 to attract a turkey.
Figure 6:
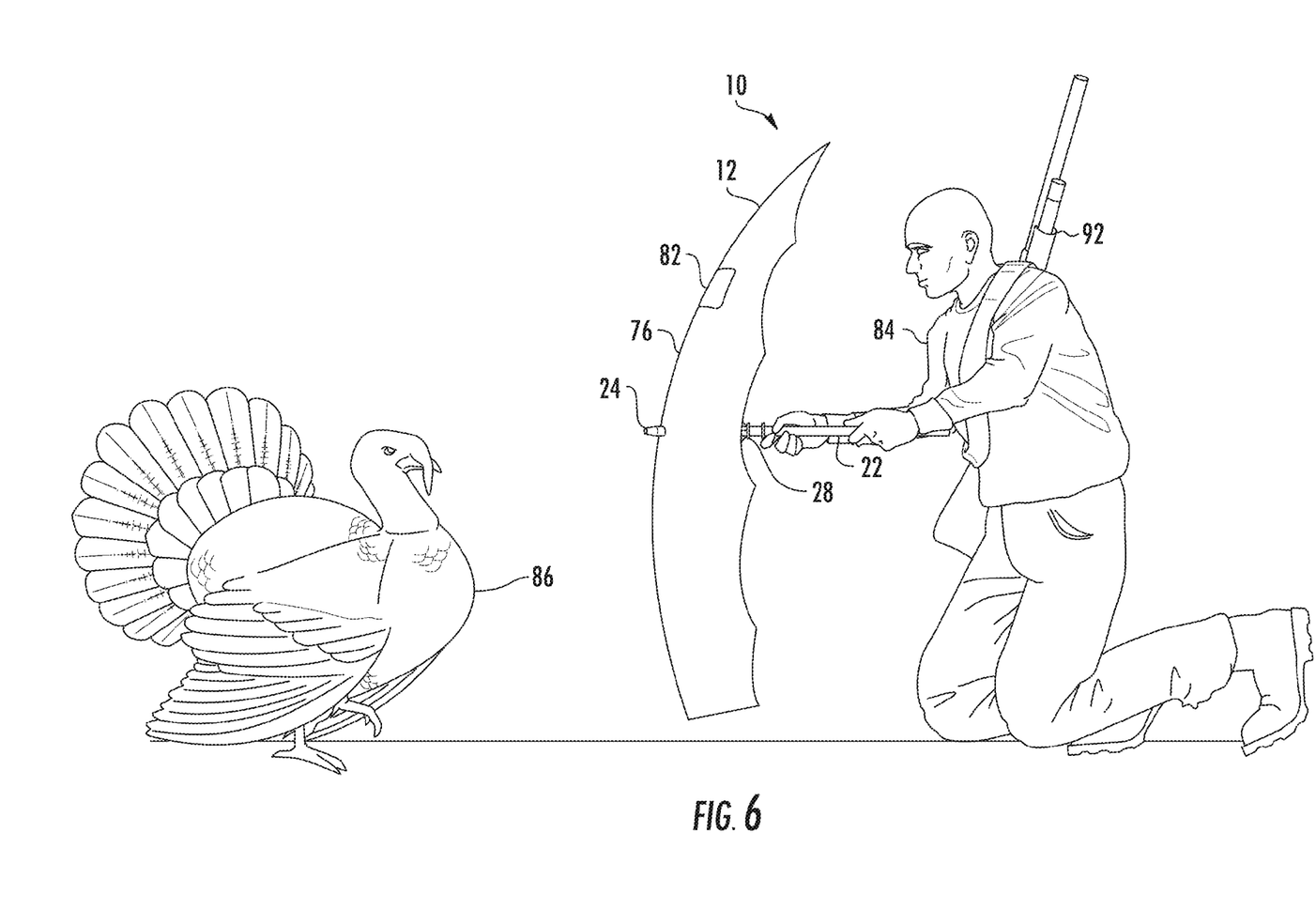
FIG. 6 illustrates a side elevation of a hunter expanding the dynamic game decoy of FIG. 1 as he approaches a turkey.

If it is desired to attract the turkey 86 in a more dynamic fashion, the hunter 84 can crawl toward the turkey 86, while pulling the runner 28 toward the handle 26, without collapsing the canopy 12 entirely, before returning the runner 28 back toward the ferrule 24. (FIGS. 4-6). By alternately pulling and pushing the runner 28 along the shaft 22 the hunter 84 causes the lure 76 on the canopy 12 to mimic a tom turkey 86 in full strut. This dynamic motion further engages the turkey 86, distracting the turkey 86 from any exposed hunter's extremities 90, allowing the hunter 84 to approach close enough to the turkey 86 to use a gun 92 to shoot the turkey 86. The strutting action may even entice the turkey 86 to move even closer to the approaching hunter 84. Once the turkey 86 is within the desired range, the hunter 84 may place the expanded decoy 10 on the ground in front of the hunter, aim the gun 92, and shoot the turkey 86.

While in the preferred embodiment, the gun 92 is a shotgun; the gun 92 may be any suitable weapon or may be a bow and arrow or similar device. Although in the preferred embodiment, the decoy 10 is actuated with two hands, and the gun 92 carried on the hunters back 94 if desired, the gun may be held in the same hand as the shaft 22, as the opposite hand actuates the runner 28 thereby allowing for faster deployment of the gun 92.

Figure 7:
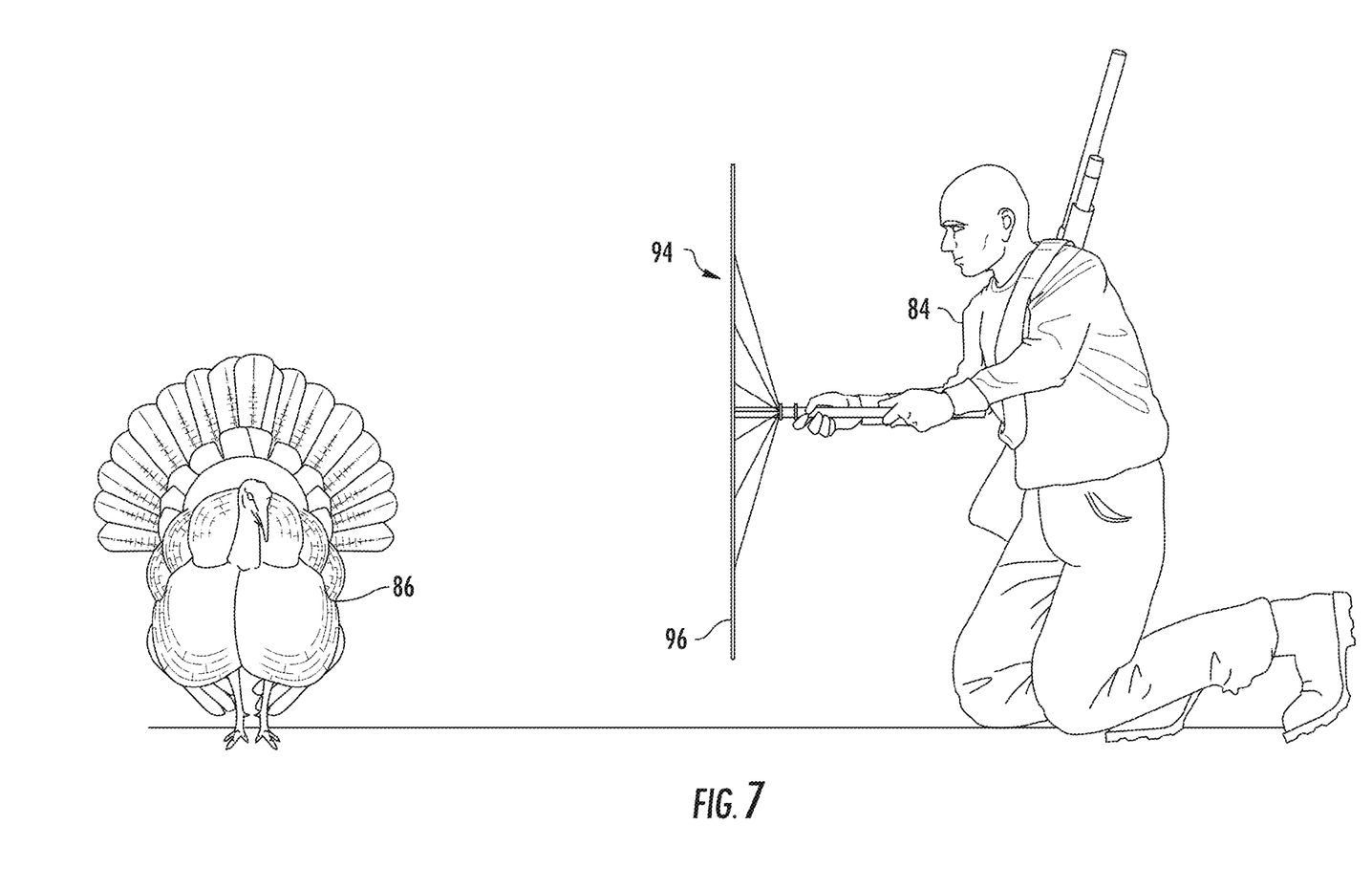
FIG. 7 illustrates a side elevation of an alternative embodiment of the dynamic game decoy of the present invention, provided with a flat canopy.

An alternative embodiment of a decoy 94 is shown in FIG. 7, where the canopy 96 is flat, rather than curved. The flat canopy 96 allows a smaller and lighter decoy 94 to be used provide the same silhouette as a larger and heavier curved decoy 10.

Although the invention has been described with respect to a preferred embodiment thereof, it is to be understood that it is not to be so limited since changes and modifications can be made therein which are within the full, intended scope of this invention as defined by the appended claims.

What is claimed is:

1. A method of turkey hunting comprising:
    (a) providing a decoy comprising:
        (i) an asymmetric canopy having a generally curved side and a generally flat side;
        (ii) a shaft extending at least partially below the canopy;
        (iii) a slide slidably coupled to the shaft;
        (iv) extensible rib assemblies coupled between the canopy and the shaft;
        (v) wherein the slide is slidable between a first position, extensible rib assemblies collapse the canopy, and a second position where the extensible rib assemblies open the canopy;
        (vi) wherein an image of a turkey is provided on the canopy; and
    (b) engaging a turkey while holding the canopy with the image of a turkey facing the turkey and alternately opening and closing the canopy in a manner that mimics a moving turkey.

2. The method of turkey hunting of claim 1, wherein the canopy is asymmetric along a line centrally located between the generally curved side and the generally flat side.

3. The method of turkey hunting of claim 1, wherein when in the second position, at least a portion of the generally flat side is closer to the shaft than the generally curved side.

4. The method of turkey hunting of claim 1, wherein the extensible rib assemblies comprise:
    a. at least eleven extensible rib assemblies coupled between the canopy and the shaft;
    b. wherein a first plurality of the at least eleven rib assemblies are coupled between the canopy and the shaft forming the curved side;

c. wherein a second plurality of the at least eleven rib assemblies are coupled between the canopy and the shaft forming the flat side; and
d. wherein at least one rib assembly of the second plurality of the at least eleven rib assemblies is shorter than the first plurality of the at least eleven rib assemblies.

5. The method of turkey hunting of claim 1, wherein the extensible rib assemblies comprise:
   a. at least sixteen rib assemblies coupled between the canopy and the shaft;
   b. wherein a first plurality of the at least sixteen rib assemblies are coupled between the canopy and the shaft forming the curved side;
   c. wherein a second plurality of the at least sixteen rib assemblies are coupled between the canopy and the shaft forming the flat side; and
   d. wherein at least one rib assembly of the second plurality of the at least sixteen rib assemblies is shorter than the first plurality of the at least sixteen rib assemblies.

* * * * *

UNITED STATES PATENT AND TRADEMARK OFFICE
CERTIFICATE OF CORRECTION

PATENT NO. : 9,622,468 B2
APPLICATION NO. : 14/087135
DATED : April 18, 2017
INVENTOR(S) : William Glen Downard It is certified that error appears in the above-identified patent and that said Letters Patent is hereby corrected as shown below:

In the Claims

Column 4 Line 47 In Claim 1, following "second position" and before "extensible" please insert --where the--.

Signed and Sealed this
Thirtieth Day of May, 2017

Michelle K. Lee
*Director of the United States Patent and Trademark Office*